United States Patent [19]

Wengrzynek

[11] Patent Number: 5,174,897
[45] Date of Patent: Dec. 29, 1992

[54] CONSTRUCTED WETLANDS TO CONTROL NONPOINT SOURCE POLLUTION

[75] Inventor: Robert J. Wengrzynek, Old Town, Me.

[73] Assignee: The United States of America as represented by the Secretary of Agriculture, Washington, D.C.

[21] Appl. No.: 764,924

[22] Filed: Sep. 24, 1991

[51] Int. Cl.⁵ .............................................. C02F 3/32
[52] U.S. Cl. .................................. 210/602; 210/747; 210/767; 210/170; 210/542; 405/15; 405/128; 405/262
[58] Field of Search ............... 210/800, 513, 767, 790, 210/804, 806, 807, 805, 170, 541, 542, 602, 747; 405/15, 128, 258, 262

[56] References Cited

PUBLICATIONS

Constructed Wetlands for Wastewater Treatment, (Lewis Publishers, 1989), Hammer.

Primary Examiner—Frank Sever
Attorney, Agent, or Firm—M. Howard Silverstein; John D. Fado

[57] ABSTRACT

The construct containing in hydraulic order a sediment basin, level-lip spreader, grassy filter, wetland, and deep pond can be used to remove pollutants from nonpoint source runoff. Wetlands are planted with vegetation that encourages growth of aerobic and anaerobic bacteria which are helpful in removing and detoxifying contaminants.

20 Claims, 2 Drawing Sheets

CONSTRUCTED WETLANDS TO CONTROL NONPOINT SOURCE POLLUTION

FIELD OF THE INVENTION

The use of land for agriculture, urban development, and recreational purposes results in pollution that has potential to contaminate groundwater, streams, lakes and oceans. Aquatic ecosystems can be damaged by even small amounts of pollutants in runoff during storms and by cumulative impacts of chronic, low levels of pollution. Nutrients, pesticides and sediments can have long term effects on the ecosystems. The instant invention using constructed wetlands has been particularly useful for purposes of protecting ecosystems from untoward effects of nonpoint source pollution.

BACKGROUND OF THE INVENTION

Agricultural and urban land uses often contribute to nonpoint source pollution of lakes and streams resulting in impairment of fisheries, recreational areas, and public waterways. Methods of reducing pollution using conventional treatment methods usually used to reduce pollution from point sources such as sewage outlets and disposal outlets carrying industrial wastes are inappropriate for us in treating nonpoint source pollution such as runoff from fields and golf courses.

The use of constructed wetlands in water pollution control has been known. *Constructed Wetlands for Wastewater Treatment* by Donald A. Hammer (Lewis Publishers, 1989) gives an overview of use of constructed wetlands for control of pollution from municipal, industrial and agricultural sources. Among the constructs disclosed therein is a wetland system that uses a "debris basin" to retain gross debris and serves as a distribution structure which then discharges stormwater runoff to a parkland and wildlife habitat area that eventually drains into a bay. The system works primarily to detain water for controlled distribution to the parkland area. The construct does not provide for sediment collection or for treatment of runoff by passage through the system comprising a grass filter and a constructed wetland as disclosed herein.

In another chapter, Hammer describes a method for treatment of stormwater runoff from a shopping mall. The water was collected in two separate basins, then directed through a box culvert to a wet detention pond and, finally, through a series of wetland basins The system lacks several components of the instantly disclosed construct. For example, the level-lip spreader and grass filter are not seen in that disclosure. That construct as taught by Hammer is not appropriate for use in control of runoff from golf courses or fields.

In yet another use of constructed wetlands disclosed in Hammer, the wetland was used to treat landfill leachate. The construct disclosed therein differs substantially from that of the present invention. That construct required collection of the leachate in ranks for dispersal into the treatment area. That construct lacked the grass filter, level lip spreader and deep pond used in the present construct. That construct taught by Hammer would not be appropriate for use in control of non-point source pollution such as runoff from fields.

In 1990 a compilation of papers was prepared for inclusion in a publication distributed at an International Conference on Use of Constructed Wetlands in Water Pollution Control. While some of the components of the instantly disclosed invention were used by the authors, none of the constructs combined the use of the sediment basin, level lip spreader and grass filter in the manner of the invention.

Some teachings regarding use of planted constructs to control pollution and erosion are seen in the patent literature. U.S. Pat. No. 4,345,856 to Tuck discloses the use of a combination of rip rap, loam and plantings. No pollution controlling wetlands are constructed.

U.S. Pat. No. 4,839,051 to Higa discloses a means of treating contaminated water requiring dispersal of water from a tank into an area that has been planted with plants of differing root lengths. No sediment basin, level-lip spreader, or grass filter is disclosed therein. The method would not be appropriate for control of nonpoint source pollution.

U.S. Pat. No. 4,995,969 to LaVigne discloses a living filter system for treatment of sanitary landfill leachate. The construct comprises a treatment basin lined with a water-impervious material and planted with leachate-toleran plants growing in the treatment medium. The leachate is applied to the system from a tank. No sediment basin or grass filter is seen disclosed therein.

In 1988 the Environmental Protection Agency, Office of Research and Development, published a design manual for constructed wetlands and aquatic plant systems for municipal wastewater treatment. That manual did not disclose the use of the level-lip spreader and grass filter or the deep pond as used in the system described herein. The system was primarily concerned with the use of wetland plants such as cattails, bulrushes, and reeds. The effluent was supplied to the system through a pipe and pumping system.

SUMMARY OF THE INVENTION

It is the purpose of the invention to provide a nutrient/sediment control system for treating nonpoint pollution using physical and biological means to remove sediment, nutrients, bacteria, pesticides and organic matter from nonpoint source water. In a preferred embodiment, the individual components of a system, in hydraulic order, include a sediment basin, level-lip spreader, grass filter, constructed wetland, pond and vegetated polishing filter. The sediment basin, level-lip spreader and grass filter in combination remove much of the nitrogenous waste and sediment.

The system as described provides nutrient/sediment control system which meets the following standard:
1. Failure of the system will not result in loss of life, damage to homes, commercial or industrial buildings, main highways or railroads, nor cause interruption of public utilities.
2. The system can be applied to intensively used agricultural or nonagricultural land where traditional structural or additional non-structural practices are either not feasible or desirable or practical, or where preservation of the quality of the receiving water is important and additional treatment of runoff is need to reduce pollution.

It is possible to practice the invention without introducing unsightly changes in the landscape and to use the constructs in conjunction with other soil and water conservation practices that conserve nutrients and protect from erosion. The system can be used to reduce attached and soluble nutrients (including phosphorus, sediment, fecal bacteria, pesticides, and organic matter).

DETAILED DESCRIPTION OF THE INVENTION

Figure 1:
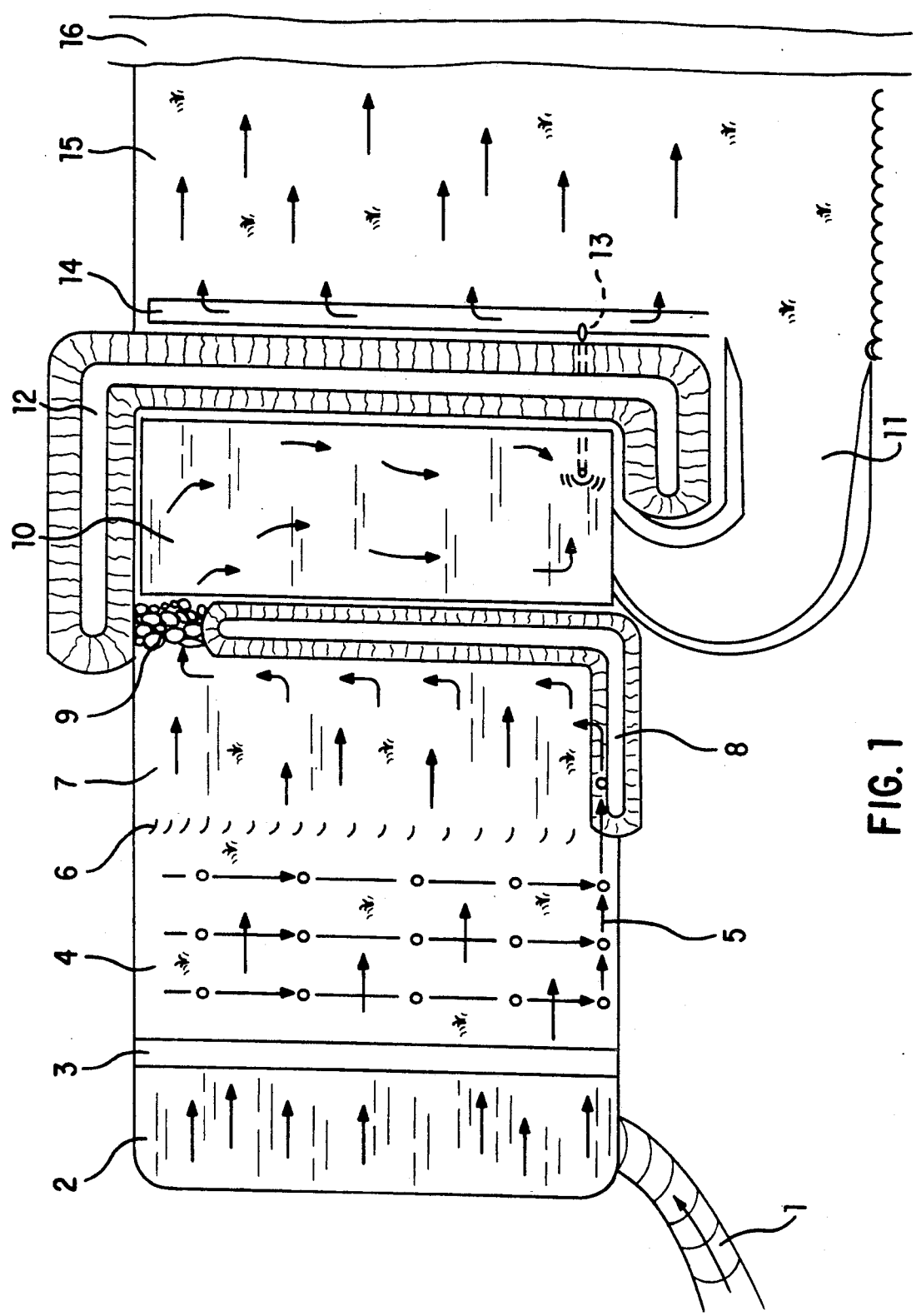
FIG. 1 is an overhead view of the pollution control system.

Referring to the drawings, FIG. 1 is a diagrammatic depiction of an embodiment of the constructed system from above looking down on the construct of the invention. The structure referenced by numeral 1 is a conduit for controlled delivery of runoff from agricultural or recreational land. While a conduit may be provided to lead from a collecting trough there may be no need for such a conduit, since runoff may simply flow down directly into the sediment basin (2). The fluid flows from the sediment basin (2) into the level lip spreader (3) which is designed to distribute the flow uniformly onto the primary grass filter (4). Under the grass filter is a sub-surface tile drainage system (5). At the end of the grass filter there may be a change in slope (6) into the wetland area (7). The wetland may end at a training dike (s) which is usually constructed to maintain a depth of about 18 inches of water at the deepest part of the wetland construct. At one end of the dike there is an outlet (9) which allows water to flow into the deep water pond (10). At the end of the deep water most distant from the outlet of the wetland is an emergency spillway (11) that permits water to exit the pond when the water level is unusually high. A dike (12) is constructed to retain water in the pond to a depth of 7-15 feet. There is an outlet pipe (13) that discharges water from the pond onto a spreader ditch (14) which then distributes the water onto a grass or woodlands polishing filter (15). The water from the polishing filter flows into the final outlet (16).

Figure 2:
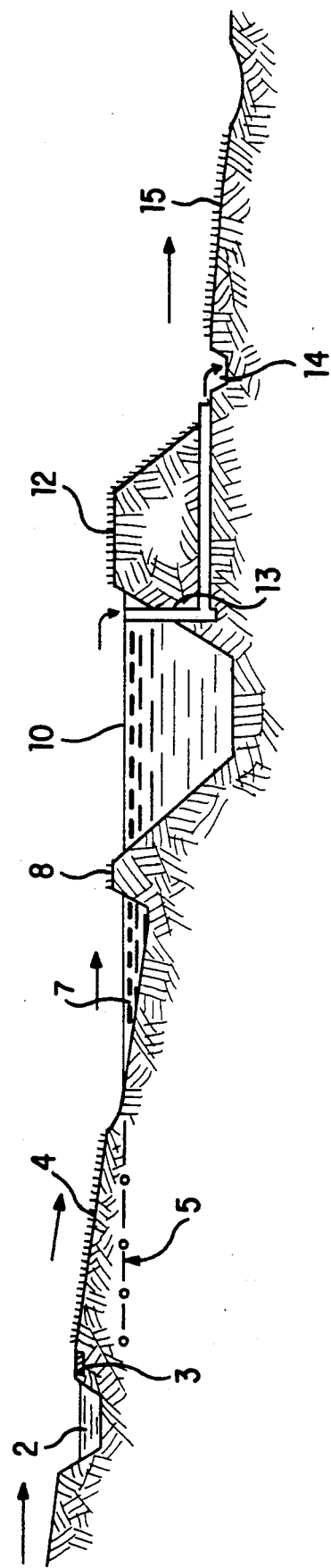
FIG. 2 is a vertical cross-section view of the pollution control system of the invention.

FIG. 2 is a vertical view of the same construct wherein 2 is the sediment basin, 3 is the level lip spreader, 4 is the primary grass filter, 3 is the drainage system, 7 is the wetland, 9 is the dike that ends the wetland area, 10 is the deep water pond, 12 is the dike between the deep pond and the spreader ditch (14), and 15 is the polishing area.

The constructs of the invention are specifically designed to protect and improve water quality by immediate reduction of large amounts of pollutants. Monitoring systems built according to the design of the invention in the state of Maine resulted in removal of 90-100% of the suspended solids, 85-100% total phosphorous, 80-100% of the total nitrogen, 65-90% fecal coliforms, and resulted in a 90-100% decrease in biological oxygen demand (BOD) during treatment of water runoff from an intensively cultivated agricultural watershed. The water leaving the system is generally well oxygenated due to removal of sediment and organic material, results of aquatic plant photosynthesis, and from aeration through the outlet pipe from the deep pond.

It is, of course, necessary that the practice of the invention be accomplished in accord with local and state codes and ordinances. Soil and water conservation treatment in the watershed must be installed to the extent practicable to comply with acceptable standards to reduce erosion and the delivery of sediment, nutrients and organic matter. Fertilizer and pesticides should be used only in accord with accepted standards.

While the figures depict one embodiment of the invention, it should be obvious to one of ordinary skill in the art that the size of components will vary with the expected amount and nature of the runoff. Indeed, some components of the construct may be completely eliminated without deviating from the spirit of the invention.

Sediment basin

The sediment basin is designed to collect larger sediment particles and organic matter from runoff water prior to routing through the treatment system. The basin provides pre-treatment which protects the function of the other components. It also serves to regulate flow to minimize excessive flushing of the pond and wetlands.

In a preferred embodiment, a trapezoidal trench was created that was located across the slope of the watershed. There was no need for a conduit as shown at 1 of FIG. 1. The bottom width of the trench was built to accommodate standard equipment used for excavation. The side slopes were $\leq 2$ horizontal to 1 vertical. The length of the sediment basin used is usually at least equal to the width of the grass filter. It is usually advantageous to have the sediment basin at least 4 feet deep. If possible, it is preferable that the trench be 5-7 feet deep. The depth should be sufficient to accommodate excavation equipment used to clean this type of structure. A ramp may be provided at one or both ends for access to facilitate sediment removal. Such ramps should, preferably, be no steeper than 4 horizontal to 1 vertical. It is preferable that the basin be sufficiently large that smaller runoff events will not even fill the basin. Water will then evaporate or infiltrate without resulting discharge. Under these conditions, the stress on the aquatic components is decreased.

If the water enters the basin from a natural or excavated channel (FIG. 1 (1)), the side slope of the basin must be protected against erosion, since the water enters with considerable force during heavy rains or periods of rapid thaw.

Level-lip Spreader

This component provides control of the flow from the sediment basin so that the water flows in a sheet over the primary grass filter. It is preferred that the spreader have a berm width of about 6 feet. Within the berm there should be a trench filled with crushed or graded stone. In the preferred embodiment the trench was about three feet wide and about one foot deep. Preferred stone size is 2-3 inches in diameter, though stones as small as 1 inch diameter can be used When the area available for grass filter and wetlands is limited, it is particularly important to have the level-lip spreader to assure that the water from the sediment basin will flow in a relatively uniform sheet over the primary grass filter.

Primary Grass Filter

The grasses grown on the grassed filter will depend on the locale in which the construct is built. In Maine, cool season grasses are used. (Reed Canary grass was not recommended for use in Maine or areas with similar climate and soil conditions.) The grass filter is designed to receive a uniformly distributed flow from the sediment basin and to maintain sheet flow to the wetland. The grassed filter is usually constructed with a subsurface drain system. (see 5 in FIG. 2.) The tile drainage is required in some soils to increase infiltration, maintain a root zone in an aerobic condition, and to prevent the area from being saturated for extended periods. Mowing and removal of grass is done to maintain a dense sod to maximize effectiveness of the filter and to remove nutrients assimilated by the growing plants. It is recommended that the slope be 0.5% to 3%. However, the slope will depend on the natural configuration of the land. For each per cent of increase in slope over 3%, the length of the grass filter should, if possible, be increased by 20%.

The subsurface drainage system should be installed under the primary grassed filter to improve infiltration of runoff water, plant rooting depth, and trafficability for mowing. Spacing should be in accordance with usual guidelines for the particular conditions. Minimum pipe size recommended if four (4) inches diameter of perforated pipe drain tile. It is desirable to use, in conjunction with tile, guard fabric and gravel filter to help prevent roots from clogging the drain field. The tile should outlet into the wetland if nitrates are at unacceptable levels. If, however, nitrogen levels are not elevated, the tile may outlet into the deep water pond.

When there is abnormal runoff of pesticides, the grass filter acts as a buffer to protect the aquatic components. While such runoff does damage the grass, it is easier to reestablish the grass filter than the aquatic communities in the wetland and pond. Care should be taken to assure that tile lines are maintained to allow free flow within the system.

It is recommended that vegetation be mowed to about three inch height at least twice during the growing season. In the northern parts of the United States, it is suggested that the first harvesting should occur between June 25 and July 5 and that the last harvesting occur between September 1 and October 1. Mowing before June 25 may destroy duck nests. At the end of the growing season, the harvesting should result in a grass stand of at least six inches in height. Regrading, reseeding, and addition of nutrients can be practiced as needed to protect the filter.

Wetland

The wetland should be constructed to maintain shallow water and saturated soil conditions. The wetland causes a beneficial combination of anaerobic and aerobic conditions in the soil and organic matter layer. Such conditions are especially important for removal of nitrogen and ammonia. To this end, it is desirable that conditions be maintained that encourage growth of a dense stand of emergent aquatic plants that provide a habitat for important micro and macro organisms.

Water purification functions of wetlands are dependent upon four principle components-vegetation, water column, substrates, and microbial populations. The stems and leaves in the water column obstruct flow and facilitate sedimentation, provide substantial quantities of surface area for attachment of microbes, and increase the amount of aerobic microbial environment in the substrate incidental to the unique adaptation that allows wetlands plants to thrive in saturated soils. Wetland plants have specialized structures in their leaves, stems and roots that conduct atmospheric gases, including oxygen, down into the roots. Because the outer covering of the root hairs is not a perfect seal, oxygen leaks out creating a thin film of aerobic region around each root hair. Wetlands vegetation increases the amount of aerobic environment available for microbial populations both above and below the surface. Wetlands plants generally take up only very small quantities of nutrients or other substances removed from influent water, though periodic harvesting does increase removal of nutrients.

The atmosphere allowing growth of microbes such as bacteria, fungi, algae, and protozoa is of particular importance in altering contaminant substances in the wetland. In addition to their ability to alter contaminants to render them less noxious, many microbes prey on pathogenic organism. The effectiveness of the wetlands is dependent on developing and maintaining optimal environments for desired microbial populations.

Vegetation in the wetland includes such species as cattail (*Typha*), bulrush (*Scirpus validus or cyperinus*), sago podweed (*Potomogeton pectinata*), reeds (*Phragmites*) and rushes (*Juncus, eleocharis*). The most important aquatic plant species used in North America is cattail (*Typha latifolia*). Cattails are highly effective for creating an environment appropriate for beneficial microbial growth and are at home in most of the United States. While native plants may be planted in the wetland, plants may be introduced into the construct from other locales. Sago podweed is an appropriate plant where water depth exceeds 15 inches.

The wetland will receive water from sheet flow and from subsurface flow through the subsurface tile system in the grassed filter. In the construct exemplified in the figures, a training dike was located between the wetland and the pond to avoid short circuit flow through the pond. In the preferred embodiment, the outlet of the wetland (9) is located at the point farthest from the outlet and emergency spillway of the deep pond.

Water in the wetland ranges in depth from the zone of saturation (zero depth) to about three feet. In the preferred embodiment for use in New England, the depth was about 18 inches near the training dike. If the flow path through the wetland and pond is elongated due to site characteristics it is not necessary to have a training dike.

In construction of the wetlands in New England it is best if the site can be prepared by spreading top soil to a depth of at least 4 inches. The soil must be sufficiently heavy to support the root systems of the wetland plants. Amount and types of soil needed at any particular site will depend on the properties of the soil in the wetland area and the availability of top soil for placement in the construct. Water levels are determined by the height of the riser in the pond and the outlet of the trainer dike (if there is a dike).

Planting in Northern United States and southern Canada is usually done sometime between May 1 and June 30 or August 15 and September 15 to avoid prolonged hot or dry periods. Planting times will depend on the locale since periods of excessive heat and drought will vary with the region in which the construct is located. Sago podweed is usually planted after the system is established. It can usually be planted about one year after the establishment of the system in 1.5 to 3 feet of water when there is no training dike so that water from the wetland flows into the pond or woodlands an grasslands.

It is important that roots of vegetation be kept moist and cool during transportation to the site. It is preferred that temporary storage not exceed three days. Temperatures of 35° F to 40° F are preferred during storage. Cattail cuttings are usually placed 24 to 30 inches apart in staggered rows from the zone of saturation to a water depth of 12 inches.

Deep Water Pond

The deep pond is designed to provide a limnetic biological filter for nutrient and fine sediment removal. The pond acts as a living filter which provides habitat for a variety of organisms. The pond is stocked with selected species of fish which feed on plankton and other micro organisms. In the constructs built in Maine, cyprinids and castostomids were stocked because they feed on phytoplankton and zooplankton and readily tolerate lower oxygen conditions. It is important that species native to the watershed be used in constructs of the invention to avoid introduction of unwanted species. (Bottom feeders such as catfish (*Ictaluridae*) and carp (*Cyprinus carpio*) are not considered suitable because they cause turbidity which reduces biological activity needed for the pond to function efficiently.) Indigenous species such as freshwater mussels (filter feeders) may also be stocked in the pond where possible. Intensive fish harvesting will remove some nutrients. Preditation by mammals and birds will also result in harvest of nutrients. Fish species are selected that will tolerate lower oxygen and high turbidity and which function to further the efficiency of the system. The pond should, if the landscape permits, be 8 to 15 feet deep.

Stocking and harvest of fish will enhance the efficiency of the system as long as supplemental feeding is not provided to the fish. Fish should be harvested to the extent practicable prior to the formation of an ice cover to avoid winter kill. Shell fish, if available, (mussels or clams) should be stocked if appropriate conditions for their growth exist. In the example constructed in Maine mussels and clams were stocked at a rate of 125 per 5000 square feet of surface area one year after the ponds were constructed. The shellfish served as filter feeders to enhance the effectiveness of the pond ecosystem. Each mussel filters 10 to 12 gallons of water per day.

In constructs according the FIGS. 1 and 2, the pond was initially stocked with 250 to 500 bait fish per 5000 feet of pond area. Indigenous species were used. Common and golden shiners are examples of appropriate species for this use in Maine.

Aquatic plants that form submerged net-like growth such as Sago podweed are useful for planting in the transition area between wetland and pond when there is no dike between.

The pond is usually emptied by a drop-inlet pipe spillway (FIG. 2 (13)) with a drain for maintenance. The use of this design results in aeration of the water as it is discharged from the pond.

The pond has an emergency spillway to accommodate water in excess of capacity of the pond. The spillway should, preferably, be vegetated and must be located at the end of the pond farthest from the spillway between the wetland and the pond. The vegetation acts as a filter to reduce suspended solids during peak runoff period. It is not desirable to have a bypass of the system before this point, since the largest storm events carry the most sediment and other pollutants. Hence, it is desirable that runoff from these episodes remain in the system for as much treatment as possible.

Polishing Filter

It is desirable, if possible, to have an area of vegetation below the pond. This area should be a stable, relatively level, vegetated site. It may be grassland, wetland, or a forested area, either natural or constructed, between the outlet from the pond and the natural receiving body of water. The area should be maintained free from channel flow or gully erosion. When the polishing filter is used, the water flows from the pond though the outlet to the spreader ditch with a level-lip spreader to facilitate even dispersal of water over the finishing filter.

Results

Information collected to date on constructed wetland systems prepared and used in accord with the methods of the invention indicate that the methods are both economically and environmentally practical. At one site wherein watershed drained 20 acres of cropland the total phosphorus (TP) from the cropland was estimated to be approximately 4.5 to 7.5 lb/ac/yr. At least 25% to 40% of the total phosphorus entering the construct was soluble. The system removed 88% 15 to 100% of the total phosphorus during all monitored runoff periods.

Total suspended solids (TSS) and volatile suspended solids (VSS) were reduced by an average of 95%. About 75% of the TSS was trapped in the sediment basin, but only 4% of the total phosphorus was trapped in that basin. Hence, it can be seen that most of the attached phosphorus was transported to the system on the fine soil particles delivered during major runoff events and was removed by the grass filter, wetland and pond ecosystems.

The system was very effective during the major storms A very heavy storm (5cm/hr) rainfall) occurred in early July while the potato fields were at field moisture capacity. The system removed 94% of the TP and 95% of the TSS. Similar results occurred with all storm events. Intense, localized rainfall events of this magnitude occur frequently and are responsible for the delivery of most pollutants to our streams and lakes.

When smaller storms occurred during dry, summer conditions, all of the runoff was stored in the system. Hence, no runoff from the system occurred and pollutants were left in the system.

While it is desirable to build the entire system described herein, it should be noted that most of the nitrogen and phosphorus are removed before the water reaches the deep pond. Hence, the lack of space or appropriate terrain for building the entire system should not deter one from practice of the invention using some of the components of the hydrolic system. For example, the sediment basin, level lip spreader, and primary grassy filter will remove much of the nitrogenous pollutants and solids from runoff. Hence, a construct consisting of these elements would definitely result in improvement of water quality even if other elements of the system could not be used. Addition of a wetland to receive the water from the grassed filter will result in greatly improved removal of nitrogen and harmful microbial contaminants.

Of particular interest in this system is the use of the level-lip spreader to maximize the effect of the grassed filter and wetlands by assuring even distribution of water across the filter. Use of a spreader as taught greatly increases the efficiency of the contaminant removal process while buffering the wetland from damage.

As indicated in the description above, the flow of water to the sediment basin may be directed from the source of runoff to the sediment basin through a conduit. The conduit may be open or covered or partially covered. For example, part of the conduit may consist of culverts under roads to direct flow from runoff to the sediment basin.

I claim:

1. A constructed control system for removing contaminants from water comprising, in hydraulic order, a constructed sediment basin, a constructed level-lip spreader, and a constructed grassed filter.

2. A control system of claim 1 comprising, in order, a sediment basin, a level-lip spreader, a grassed filter, and a wetland.

3. A control system of claim 2 wherein the wetland empties into a deep pond.

4. A control system of claim 3 having, additionally, a polishing filter.

5. A control system of claim 4 wherein the polishing filter is a grassland.

6. A control system of claim 4 wherein the polishing filter is a woodland.

7. A control system of claim 4 wherein an outlet from the pond is a drop-inlet pipe which discharges water from the pond into a spreader ditch which then distributes the water onto the polishing filter.

8. A control system of claim 3 wherein the wetland and the deep pond are separated by a dike.

9. A control system of claim 8 wherein the deep pond is stocked with aquatic animals.

10. A control system claim 9 wherein the deep pond is stocked with filter feeders.

11. A control system of claim 3 wherein the wetland is planted with cattails.

12. A control system of claim 3 wherein the pond has an emergency spillway that permits water to exit the pond when the water level is unusually high.

13. A control system of claim 1 wherein a conduit empties onto the sediment basin.

14. A control system of claim 1 wherein the grassed filter has a tile drainage system.

15. A method of treating nonpoint runoff comprising constructing, in hydraulic succession, a sediment basin, a level-lip spreader and a spreader across a grassed filter and causing the runoff to successively pass therethrough.

16. A method of claim 15 wherein the water from the grassed filter flows into a wetland.

17. A method of claim 16 wherein the water flows from the wetland into a deep pond.

18. A method of claim 17 wherein the water flowing from the wetland to the deep pond crosses a dike.

19. A method of claim 17 wherein the pond is stocked with filter feeders and fish.

20. A method of claim 17 wherein the deepest part of the pond is 7 to 15 feet deep.

* * * * *